United States Patent [19]  [11]  4,388,449
Bonnet et al.  [45]  Jun. 14, 1983

[54] SILICONE RESIN

[75] Inventors: Jean-Claude Bonnet, Saint Aignan, France; Kenneth B. Pithouse, Swindon, England

[73] Assignee: Raychem Limited, London, England

[21] Appl. No.: 331,237

[22] Filed: Dec. 16, 1981

Related U.S. Application Data

[63] Continuation of Ser. No. 130,142, Mar. 13, 1980, abandoned, which is a continuation of Ser. No. 927,769, Jul. 25, 1978, abandoned.

[30] Foreign Application Priority Data

Jul. 27, 1977 [GB] United Kingdom ............... 31536/77

[51] Int. Cl.³ .......................................... C08F 283/00
[52] U.S. Cl. .................................... 525/477; 525/478; 528/10; 528/12; 528/14; 528/24
[58] Field of Search .................. 525/477, 478; 528/10, 528/14, 12, 24

[56] References Cited

U.S. PATENT DOCUMENTS 3,318,844 5/1967 Krantz ..................................... 528/10
3,489,782 1/1970 Pruvost et al. ........................ 528/10
3,634,321 1/1972 Nugent ........................... 260/46.5 R
3,832,420 8/1974 Clark ..................................... 528/10
3,929,704 12/1975 Horning ............................. 260/29.1

FOREIGN PATENT DOCUMENTS 1409517 10/1975 United Kingdom .

OTHER PUBLICATIONS

Ezrin, Polymer Molecular Weight Methods, Advances in Chemistry Series, No. 125, pp. 98–107, (1973), American Chemical Society, Washington, D.C.

Primary Examiner—Melvyn I. Marquis
Attorney, Agent, or Firm—Lyon & Lyon

[57]  ABSTRACT

The invention relates to a novel thermoplastic monoorganopolysiloxane resin comprising units of the formula $RSiO_{1.5}$ and $R_1R_2R_3SiO_{0.5}$ wherein $R,R_1,R_2$ and $R_3$ are hydrogen, or organic groups which may be the same or different, at least 85% of the R groups in the $RSiO_{1.5}$ being organic groups, and at least two of the groups $R_1$, $R_2$ and $R_3$ in each $R_1R_2R_3SiO_{0.5}$ unit being organic groups, and in which the ratio $RSiO_{1.5}$ units to $R_1R_2R_3SiO_{0.5}$ units is from 1:0.005 to 1:0.03 on a molar basis. Such resins are useful as electrical insulation material and as hold out agents for heat recoverable materials.

28 Claims, No Drawings

SILICONE RESIN

This is a continuation of application Ser. No. 130,142, filed Mar. 13, 1980, now abandoned which is a continuation of Ser. No. 927,769 filed July 25, 1978 now abandoned.

This invention relates to silicone resins, and more particularly to certain new thermoplastic polysiloxane resins having an improved combination of physical properties.

Silicone resins are conventionally manufactured by hydrolysis of halo- or alkoxy-silanes in a mixed water-/organic solvent system, which may be followed by heating, (Merrill U.S. Pat. No. 3,450,672) or heating in the presence of an alkali, catalyst, (Hyde U.S. Pat. No. 2,482,276) to improve the stability of the resin.

A particularly interesting class of silicone resins are the monoorganopolysiloxane resins which are useful inter alia in flameproof and moisture resistant compositions (British Pat. No. 1,312,576), and as hold-out agents for heat shrinkable silicone elastomer compositions having good electrical insulation properties (British Pat. No. 1,409,517). The disclosures of all these patents are incorporated herein by reference. Monoorganopolysiloxane resins according to the prior art suffer, however, from certain major disadvantages. Efforts to increase their stability by treatment according to Merrill result in gelation unless care is taken with the concentration of the solutions used. The Hyde process gives resins with no definite softening point or with a softening point which is too high for most moulding applications. Resins according to British Pat. Nos. 1,312,576 and 1,409,517 are capable of further condensation to form a crosslinked gel, giving rise to storage stability problems and to processing difficulties due to premature gelation. For many applications their softening points are also too low to be useful in heat shrinkable compositions.

There is thus a need for a thermoplastic monoorganopolysiloxane resin havin good storage stability, which can be processed by conventional melt fabrication techniques without substantial premature gelation.

In this specification the term monoorganopolysiloxane resin refers to a solid resinous non-elastomeric material comprising at least 90%, preferably greater than 95% by weight of polymerised units of the formula $RSiO_{0.5}$ where R is hydrogen or an organic group, at least 85% of the R groups being organic groups.

According to the present invention there is provided a thermoplastic monoorgano polysiloxane resin comprising units of the formula $RSiO_{1.5}$ and $R_1R_2R_3SiO_{0.5}$ wherein R, $R_1$, $R_2$ and $R_3$ are hydrogen or organic groups which may be the same or different, at least 85% of the R groups in the $RSiO_{1.5}$ units being organic groups, and at least two of the groups $R_1$, $R_2$, $R_3$ in each $R_1R_2R_3SiO_{0.5}$ units being organic groups, and in which the ratio of $RSiO_{1.5}$ units to $R_1R_2R_3SiO_{0.5}$ units is from 1:0.005 to 1:0.03 on a molar basis.

Preferably the monoorganopolysiloxane resins of the present invention have a softening point in excess of 50° C., most preferably in excess of 70° C. In this specification softening point is defined as the softening point measured by thermomechanical analysis (TMA), using, for example, a Du Pont TMA 942 instrument.

In this method a flat-sided flake of resin approximately 1 mm thick is placed under a 0.10 inch diameter flat-ended probe loaded with a 2 gram weight. The instrument is set at a sensitivity of 2 mil/inch and the sample heated at a rate of 10° C./minute. The softening point is taken as the first deviation from the base-line on the output chart which runs at 10° C./inch for the x axis.

The polysiloxane resins of the present invention are thermoplastic, that is to say, they can be fabricated at temperatures above their softening point substantially without gelation, to give products which are still substantially organic solvent soluble and melt processable. They are thus distinguished from the polymonosiloxane resins known to the art which contain a substantial number of further condensable groups and are thermosetting.

In the unit formula for the monoorganopolysiloxane resin R may be hydrogen or an organic group, provided that at least 85% of the R groups are organic groups. Where R is an organic group, this is preferably a hydrocarbon group, most preferably a methyl or phenyl group. However, other hydrocarbon groups such as alkyl, aryl, aralkyl, alkaryl, alkenyl, cycloalkyl and cycloalkenyl groups may also be used, for example, ethyl, propyl, butyl, vinyl, allyl, tolyl, xylyl, benzyl, cyclohexyl, phenylethyl and naphthyl groups and substituted hydrocarbon groups, for example halo-substituted hydrocarbon groups, amino-substituted hydrocarbon groups, and cyano substituted hydrocarbon groups. The resin may, of course comprise more than one of the groups R listed above if desired.

The groups $R_1$, $R_2$, $R_3$ may be hydrogen, or organic groups which may be the same or different, provided that at least two of the groups $R_1$, $R_2$, $R_3$ are organic groups. Preferably the groups $R_1$, $R_2$, $R_3$ are methyl or phenyl groups, but they may also optionally be one or more of the hydrocarbon groups or substituted hydrocarbon groups as listed above for R.

The preferred polysiloxane resins according to the invention comprise only methyl, or only phenyl, or a combination of methyl and phenyl groups. For certain applications, for example where the polysiloxane resin is to be incorporated in a fire retardant composition which is required to have low smoke emission, it is particularly desirable to use resins according to the invention in which up to 80% of the groups R are phenyl groups, with the remainder being methyl groups. Particularly good results have been obtained using resins in which the ratio of methyl to phenyl groups on a molar basis is from 1:3 to 3:1. Compositions comprising such resins are described and claimed in the specification of our British Patent Application No. 31,608/77.

The polysiloxane resins of the present invention preferably have a number average molecular weight of at least 1000, most preferably in the range of from 2000 to 6000, as measured by vapour phase osmometry.

Preferably the polysiloxane resins have a low SiOH content, desirably less than 2% by weight of the hydroxyl groups based on the weight of the resin as measured by the method described by R. Smith & G. E. Kellum in Anal. Chem 39 (1967) 339.

The method involves the rapid condensation of SiOH groups using a boron trifluoride-acetic acid complex catalyst in the presence of pyridine. The resin is dissolved in dry xylene, and pyridine and catalyst added, followed by addition of dry toluene. The solution is azeotropically distilled until all the water liberated by the condensation has been collected. The water in the distillate is then determined by Karl-Fischer titration.

Corrections for traces of water in the solvents are made by performing a blank test. This method gives results which are usually significantly higher than those obtained by other methods such as infrared spectroscopy, but it is believed that the method is more sensitive and gives results which more accurately reflect the total hydroxyl content of the resin.

The polysiloxane resins of the present invention may be produced, for example, by hydrolysis of the appropriate monoorgano silane or silanes to form a partially condensed organosiloxane polymer, copolymer or block copolymer resin, followed by reaction with a monofunctional organosilane capping agent, as described in our British Patent Application No. 31,535/77. Suitable hydrolysable monoorgano silanes include organohalosilanes, organoalkoxysilanes and organocarboxysilanes such as, for example, methyldichlorosilane, methyltrichlorosilane, methyldiisopropoxysilane, methyltriisopropoxysilane, methyldiacetoxysilane, methyltriacetoxy silane, phenyldichlorosilane, phenyltrichlorosilane, phenyldiisopropoxysilane and phenyltriisopropoxysilane. The preferred hydrolysable monoorganosilanes are those of formulae $RSiCl_3$, $RSi(OAlk)_3$ and $RSi(OCOAlk)_3$ where Alk represents an alkyl group, and R is as previously defined. Mixtures of any of the above hydrolysable monoorganosilanes may be used, and also mixed monoorganohaloalkoxy silanes formed by the addition of an alcohol, and particularly an aliphatic alcohol, for example, methanol, ethanol, propanol, isopropanol, butanol, pentanol, hexanol or octanol, to a monoorganohalosilane.

Hydrolysis of the monoorganosilane may be effected by adding a solution of the silane in a suitable organic solvent to water, using if necessary a co-solvent for water and the organic solvent to maintain the hydrolysis mixture substantially homogeneous. Suitable organic solvents are, for example, any which are inert to the reactants during the hydrolysis, for example benzene, toluene, xylene, petroleum ether, cyclohexane, chlorinated hydrocarbons, aliphatic and aromatic ethers and n-butylacetate. Suitable co-solvent include, for example, acetone, methyl ethyl ketone, dioxane, tetrahydrofuran, isopropanol and cellosolve. The organic solvent is preferably used in an amount of from 0.1 to 1.5 parts by weight, based on the weight of monoorganosilane. The co-solvent if used is preferably mixed with the water, and the organic solvent solution of the silane added thereto. Excess organic solvent may be added to the mixture of water and co-solvent to minimise any possibility of gelation during the reaction. Reaction temperatures are usually maintained at from 0° to 80° C., preferably from 20° to 60° C. After reaction, the aqueous layer is removed, the organic solution neutralized, for example with sodium bicarbonate, and dried.

The partially condensed organosiloxane produced is substantially uncrosslinked, or at least is insufficiently crosslinked to render it insoluble in organic solvents such as, for example, those listed previously. The organosiloxane is partially condensed, that is to say it comprises residual SiOH groups capable of further condensation on heating, or in the presence of a suitable catalyst, to produce a crosslinked infusible material. The percentage of further condensable SiOH groups expressed as the percent by weight of the hydroxyl group in the resin is preferably from 1 to 10%, as measured by the method of Smith & Kellum Anal. Chem 39 (1967) 339.

The monofunctional organosilane capping agent is then added, preferably in an amount of from 0.0005 to 0.06 parts, most preferably 0.005 to 0.02 parts, by weight, based on the weight of partially condensed monoorganosiloxane. Although the invention is not limited to any particular theory, it is believed that the effect of the capping agent is to react with certain of the SiOH groups in the organosiloxane, which would otherwise be most readily available for condensation reactions. Suitable monofunctional organosiloxanes, include for example, diorganosilanes and triorganosilanes, especially halo-, alkoxy, and carboxy-diorganosilanes and triorganosilanes, such as, for example chlorodimethylsilane, chlorotrimethylsilane, chlorodiphenylsilane, chlorotriphenylsilane, isopropoxydimethylsilane, isopropoxytrimethylsilane, isopropoxydiphenylsilane, isopropoxytriphenylsilane, acetoxydimethylsilane, acetoxytrimethylsilane, acetoxydiphenylsilane, acetoxytriphenylsilane, and in general, silanes of the formulae $R_1R_2R_3SiCl$, $R_1R_2R_3Si(OAlk)$ or $R_1R_2R_3Si(OCOAlk)$ where $R_1$, $R_2$, $R_3$ and Alk are as previously defined. Mixtures of silane capping agents may be used if desired. Where the resin prior to reaction with the capping agent comprises free Si—H groups a triorganosilane capping agent should be used.

Addition of the silane capping agent is preferably carried out at temperatures of from 20° to 150° C., most preferably from 80° to 120° C. After addition of the capping agent, the resin solution is preferably heated at a temperature of from 60° to 150° C. for a period of from 5 to 120 minutes, most preferably from 30 to 60 minutes, to equilibrate the resin. An equilibration catalyst may be added if desired, for example an acid or alkali, or kieselguhr, but this is not normally necessary as the solution is usually acidic after the capping reaction. After equilibration the resin solution may be washed to neutrality and stripped to yield the solid resin.

The polysiloxane resins of the present invention may be given a controlled degree of crosslinking if desired, for example after processing and fabrication, by the use of radiation or chemical crosslinking agents. Polysiloxane resins according to the present invention having substituents comprising olefinically unsaturated groups capable of undergoing crosslinking reactions, especially vinyl and allyl, groups, are particularly suitable for crosslinking in this fashion. For most purposes only a minor amount of substituents containing olefinically unsaturated groups is necessary, usually up to 5%, preferably up to 2%, on a molar basis. The resins may be crosslinked using radiation doses of from 2 to 80 megarads, preferably 5 to 40 megarads, or by using a chemical crosslinking agent, such as, for example, a peroxide. Suitable peroxides are those that decompose rapidly within the range of 150° C. to 250° C., including for example, dicumyl peroxide, 2,5-bis (t-butylperoxy)-2,5-dimethylhexane, 2,5-bis-(t-butylperoxy)-2,5-dimethylhexyne, and α,α-bis (t-butylperoxy) diisopropylbenzene. In a typical chemically crosslinkable composition there will be about 0.5 to 5 parts by weight of peroxide per 100 parts of polysiloxane resin. The peroxide may be adsorbed on an inert carrier such as calcium carbonate, carbon black, or kieselguhr; however, the weight of the carrier is not included in the above range.

In some cases it may be desirable to add to the crosslinkable polysiloxane resin a co-agent to assist in the crosslinking reaction. Such co-agents usually contain multiple unsaturated groups such as allyl or acrylic esters. While their mode of action is not known with certainty, it is believed that they react with the initial radical formed on the polysiloxane backbone to form a more stable radical, which undergoes coupling reactions to form crosslinks more readily than chain scission reactions. The co-agent can be for example, N,N$^1$-m-phenylene-dimaleimide, trimethylpropane, trimethacrylate, tetrallyloxyethane, triallylcyanurate, triallylisocyanurate tetramethylene glycol di-acrylate, or polyethylene oxide glycol dimethacrylate. The amount of the co-agent is preferably up to about 5 parts by weight per 100 parts of the polysiloxane, and preferably from 1 to 3 parts by weight per 100 parts of the polysiloxane.

The monoorganopolysiloxanes of the present invention may be used with outstanding success in electrical insulation applications as described and claimed in the specification of our British Patent Application No. 31,608/77, for example as components of electrical insulation compositions having improved fire retardancy and low smoke emission. They may also find application in electric power transmission systems, for example, in arc and track resistant insulation materials. Another major application for the monoorganopolysiloxanes of the present invention is as hold-out agents for heat recoverable compositions, particularly heat recoverable silicone elastomer compositions, and accordingly heat recoverable polymeric compositions comprising the monoorganopolysiloxanes are included within the invention. A heat recoverable material is one which has the property of plastic or elastic memory and, for example, may have been deformed at an elevated temperature and then cooled whilst maintained in the deformed state. A heat recoverable article treated in this manner will retain its deformed state until it is again heated, at which time it will recover towards its original shape.

Examples of heat recoverable articles and methods of making them may be found in Currie U.S. Pat. No. 2,027,962, and Cook et al U.S. Pat. No. 3,086,242, the disclosures of which are incorporated herein by reference.

Monoorganopolysiloxane resins according to the present invention have improved softening points as measured by TMA, in comparison with conventional materials which, although they are often quoted as having higher softening points, have been found to give low values by TMA measurement. It has been found by experiment the TMA measurements give a more accurate assessment of the suitability of the resins for use in heat recoverable compositions.

The monoorganopolysiloxanes of the present invention may be incorporated in a wide variety of polymers and elastomers to form heat recoverably materials. Such polymers include especially silicone elastomers such as for example polydiorganosiloxanes, for example polydimethylsiloxane, copolymers of mixed organosiloxanes, for example, copolymers, block copolymers and terpolymers of monomethylsiloxane, dimethylsiloxane, and methylvinylsiloxane, fluorosilicones, for example those derived from 3,3,3-trifluoropropylsiloxane and carborane siloxanes, for examples "Dexsil" polymers manufactured by Olin Matheson.

The invention is illustrated by the following examples:

EXAMPLE 1

A solution of methyltrichlorosilane (2165 g 14.5 moles), methylvinyldichlorosilane (42 g, 0.3 moles) in toluene (4304 g) was added over a period of one hour to a vigorously stirred mixture of toluene (1300 g), acetone (2300 g) and water (1080 g) maintaining the temperature at ~25° C. The resultant mixture was stirred for a further hour and then 2000 g water added and stirring continued for a further 30 minutes at a temperature of ~40° C.

The aqueous layer was separated and the organic layer washed to neutrality with water and sodium bicarbonate and dried by axeotropic distillation. Trimethyl chlorosilane (24 g 0.22 mole) was added and the mixture allowed to stand at room temperature overnight. The resulting solution was again washed to neutrality, dried and the resin equilibrated with 0.5 ml of a 1% solution of KOH in ethanol for 1½ hours at reflux temperature. The solution of resin was washed with water to remove the equilibration catalyst and the solvent removed by distillation and vacuum stripping.

The resultant resin had a TMA softening point of 66° C. and a number average molecular weight of 4700. The resin remained completely soluble in toluene after heating for 1 hour in air at 150° C.

EXAMPLE 2

Methyltrichlorosilane (500 g, 3.35 moles) was added from a period of about 1 hour to stirred isopropyl alcohol (471 g, 7.85 moles) maintaining the temperature below 40° C. The mixture was then heated to remove excess hydrochloric acid. To the resulting mixed isopropoxy silanes were added phenyl trichlorosilane (998 g, 4.72 moles) and toluene (2500 g). This solution was then slowly added over a period of 1½ hours to a vigorously stirred mixture of toluene (900 g), acetone (1500 g) and water (300 g). The temperature was maintained at 50° C. throughout the addition and stirring was continued for a further hour. The aqueous layer was decanted and the organic layer washed to neutrality with water and sodium bicarbonate and finally dried by azeotropic distillation. Trimethylchlorosilane (8 g, 0.1 moles) was added and the solution refluxed for 1 hour. The resulting resin solution was washed to neutrality as previously described and the solvent removed.

A yield of 90% of a clear resin was obtained having a TMA softening point of 80° C. and a number average molecular weight of 2700. The resin remained soluble in toluene after heating in air for 1 hour at 150° C. A resin prepared by a similar procedure omitting the trimethylchlorosilane capping agent, gave substantial gel after heating for 1 hour in air at 150° C.

EXAMPLE 3

A mixture of phenyltrichlorosilane (366 g, 170 moles), methyltrichlorosilane (12 kg, 80.3 moles) and vinyltrichlorosilane (2 kg, 12.4 moles) was added over 1-2 hours to a vigorously stirred solution of toluene (40 liters), acetone (40 liters) and water (10 liters), the temperature being maintained at 60°-70° C. by the rate of addition of silane.

The aqueous layer was separated and a further 5 liters of water added and the mixture refluxed for 1 hour. The aqueous layer was removed, the organic layer washed to neutrality with water and sodium bicarbonate and finally dried by azeotropic distillation. Trimethylchlorosilane (425 g, 3.91 moles) was added and the solution refluxed for 1 hour. The resin solution was washed to neutrality and the solvent removed by distillation and finally vacuum stripping at 185° C.

A yield of 90% of a clear resin was obtained having a TMA softening point of 131° C. and a residual SiOH content of 0.27%.

EXAMPLE 4

This example describes the use of a thermoplastic monoorganosiloxane resin according to the invention in a heat recoverable composition.

A composition was used as follows in which all parts are by weight:

| | |
|---|---|
| E315 type 50 polydimethylsiloxane elastomer containing 27% by weight of surface treated silica filler (manufactured by ICI) | 100 |
| Monomethylphenyl siloxane resin prepared according to Example 3 | 35 |
| 2,4 dichlorobenzoyl peroxide (50% concentration adsorbed on an inert filler) | 1.5 |

The elastomer was placed on a mill, the resin added, and the mixture heated at 120° C. for 5 minutes. The mixture was cooled, the peroxide added, and the composition extruded at room temperature as a tube of 0.25 inch internal diameter. The tube was passed through a hot air vulcanising oven at a temperature of 250° C. and a speed of 8 ft/min. After cooling, the tube was expanded, by heating at 180° C. and applying an internal pressure, to an expansion ratio of 1.8:1 cooled in the expanded state. The tube retained its expanded configuration until heated once more to 180° C. whereupon it recovered to its original size.

What is claimed is:

1. A melt processable thermoplastic monoorganopolysiloxane resin comprising units of the formula $RSiO_{1.5}$ and $R_1R_2R_3SiO_{0.5}$ wherein each of R, $R_1$, $R_2$ and $R_3$ is independently hydrogen, or an organic group, at least 85% of the R groups in the $RSiO_{1.5}$ units being organic groups, and at least two of the groups $R_1$, $R_2$ and $R_3$ in each $R_1R_2R_3SiO_{0.5}$ unit being organic groups, and in which the molar ratio of $RSiO_{1.5}$ units to $R_1R_2R_3SiO_{0.5}$ units is from 1:0.005 to 1:0.03 respectively, and wherein the organopolysiloxane contains Si—OH groups, the percentage by weight of said hydroxyl groups, based on the weight of the resin, being less than 2% and which has a number average molecular weight in the range of from 2,000–6,000, as measured by vapor phase osmometry.

2. The polysiloxane resin of claim 1, having a softening point in excess of 50° C., measured by thermomechanical analysis.

3. The polysiloxane resin of claim 1, in which R is a hydrocarbon group or a substituted hydrocarbon group.

4. The polysiloxane resin of claim 3, in which R is a methyl or phenyl group.

5. The polysiloxane resin of claim 1, in which $R_1$, $R_2$ and $R_3$ are substituted or unsubstituted hydrocarbon groups.

6. The polysiloxane resin of claim 5, in which $R_1$, $R_2$ and $R_3$ are independently each a methyl or phenyl group.

7. The polysiloxane resin of claim 1, in which up to 80% of the groups R are phenyl groups, with the remainder being methyl groups.

8. The polysiloxane resin of claim 7, in which the ratio of methyl to phenyl groups on a molar basis is from 1:4 to 4:1.

9. The polysiloxane resin of claim 1, which includes a minor amount of an olefinically unsaturated substituent group capable of undergoing crosslinking reactions.

10. The polysiloxane resin of claim 9, in which the substituent group comprises a vinyl or an allyl group.

11. The polysiloxane resin according to claim 9, in which the substituent is present in a molar amount of up to 5%.

12. The polysiloxane resin of claim 1, in cross-linked form.

13. A blend of polymers comprising, as one constituent, the polysiloxane resin of claim 1 and wherein the polysiloxane resin is selected from a non-crosslinked or crosslinked form.

14. The polymeric blend of claim 13 which also comprises as another constituent a silicone elastomer.

15. Electrical insulation comprising the polysiloxane resin of claim 1 wherein the polysiloxane resin is selected from a non-crosslinked or crosslinked form.

16. An article capable of being rendered heat recoverable comprising a melt processable thermoplastic monoorganopolysiloxane resin comprising units of the formula $RSiO_{1.5}$ and $R_1R_2R_3SiO_{0.5}$ wherein each of R, $R_1$, $R_2$ and $R_3$ is independently hydrogen, or an organic group, at least 85% of the R groups in the $RSiO_{1.5}$ units being organic groups, and at least two of the groups $R_1$, $R_2$ and $R_3$ in each $R_1R_2R_3SiO_{0.5}$ unit being organic groups, and in which the molar ratio of $RSiO_{1.5}$ units to $R_1R_2R_3SiO_{0.5}$ units is from 1:0.005 to 1:0.03 respectively, and wherein the organopolysiloxane comprises Si—OH groups, the percentage by weight, based on the weight of the resin, of said hydroxyl groups being less than 2% and which has, a number average molecular weight in the range 2,000–6,000 as measured by vapor phase osmometry.

17. The article according to claim 16 in which the resin is crosslinked.

18. The article according to claim 17 in which the resin is uncrosslinked.

19. The article of claim 16 which has been rendered heat recoverable.

20. The article of claim 19 which has been heat recovered.

21. An article which is capable of being rendered heat recoverable comprising a blend of polymers of which a constituent is a melt processable thermoplastic monoorganopolysiloxane resin comprising units of the formula $RSiO_{1.5}$ and $R_1R_2R_3SiO_{0.5}$ wherein each of R, $R_1$, $R_2$ and $R_3$ is independently hydrogen, or an organic group, at least 85% of the R groups in the $RSiO_{1.5}$ units being organic groups, and at least two of the groups $R_1$, $R_2$ and $R_3$ in each of $R_1R_2R_3SiO_{0.5}$ unit being organic groups, and in which the molar ratio of $RSiO_{1.5}$ units to $R_1R_2R_3SiO_{0.5}$ units is from 1:0.005 to 1:0.03 respectively, and wherein the organopolysiloxane comprises Si—OH groups, the percentage by weight, based on the weight of the resin, of said hydroxyl groups being less than 2% and which has, a number average molecular weight in the range 2,000–6,000, as measured by vapor phase osmometry.

22. The article of claim 21 in which the polymers are crosslinked.

23. The article of claim 21 in which the polymers are uncrosslinked.

24. The article of claim 21 which has been rendered heat recoverable.

25. The article of claim 24 which has been heat recovered.

26. Electrical insulation which comprises a blend of polymers of which a constituent is a melt processable theromplastic monoorganopolysiloxane resin comprising units of the formula $RSiO_{1.5}$ and $R_1R_2R_3SiO_{0.5}$ wherein each of R, $R_1$, $R_2$ and $R_3$ is independently hydrogen, or an organic group, at least 85% of the R groups in the $RSiO_{1.5}$ units being organic groups, and at least two of the groups $R_1$, $R_2$ and $R_3$ in each $R_1R_2R_3SiO_{0.5}$ unit being organic groups, and in which the molar ratio of $RSiO_{1.5}$ units to $R_1R_2R_3SiO_{0.5}$ units is from 1:0.005 to 1:0.03 respectively, and wherein the organopolysiloxane comprises Si—OH groups, the percentage by weight, based on the weight of the resin, of said hydroxyl groups being less than 2% and which has, a number average molecular weight in the range 2,000–6,000 as measured by vapor phase osmometry.

27. The insulation of claim 26 in which the polymers are crosslinked.

28. The insulation of claim 26 in which the polymers are uncrosslinked.

* * * * *